US012263523B2

(12) United States Patent
Anai et al.

(10) Patent No.: US 12,263,523 B2
(45) Date of Patent: Apr. 1, 2025

(54) METHOD FOR PRODUCING BONDING COMPOSITION

(71) Applicant: Mitsui Mining & Smelting Co., Ltd., Tokyo (JP)

(72) Inventors: Kei Anai, Ageo (JP); Shinichi Yamauchi, Ageo (JP); Jung-Lae Jo, Ageo (JP)

(73) Assignee: Mitsui Mining & Smelting Co., Ltd. (JP)

( * ) Notice: Subject to any disclaimer, the term of this patent is extended or adjusted under 35 U.S.C. 154(b) by 201 days.

(21) Appl. No.: 17/910,925

(22) PCT Filed: Mar. 12, 2021

(86) PCT No.: PCT/JP2021/010064
§ 371 (c)(1),
(2) Date: Sep. 12, 2022

(87) PCT Pub. No.: WO2021/193144
PCT Pub. Date: Sep. 30, 2021

(65) Prior Publication Data

US 2023/0137716 A1 May 4, 2023

(30) Foreign Application Priority Data

Mar. 27, 2020 (JP) ................................. 2020-058512

(51) Int. Cl.
*B22F 1/00* (2022.01)
*B22F 1/054* (2022.01)
(Continued)

(52) U.S. Cl.
CPC ................ *B22F 1/00* (2013.01); *B22F 1/056* (2022.01); *B22F 1/107* (2022.01); *B22F 9/24* (2013.01);
(Continued)

(58) Field of Classification Search
CPC ............... B22F 1/00; B22F 1/056; B22F 9/24
(Continued)

(56) References Cited

U.S. PATENT DOCUMENTS

2009/0146117 A1 6/2009 Suenaga et al.
2017/0213615 A1 * 7/2017 Okada .................. B22F 3/1021
2018/0315519 A1 11/2018 Sugiura et al.

FOREIGN PATENT DOCUMENTS

EP 2923781 A1 9/2015
EP 3113897 B1 1/2017
(Continued)

OTHER PUBLICATIONS

International Search Report (English and Japanese) issued in PCT/JP2021/010064, mailed Apr. 20, 2021; ISA/JP (5 pages).

*Primary Examiner* — S. Behrooz Ghorishi
*Assistant Examiner* — Gregory C. Grosso
(74) *Attorney, Agent, or Firm* — Harness, Dickey & Pierce, P.L.C.

(57) ABSTRACT

A method is provided for producing a bonding composition containing copper particles and a second liquid medium. In this production method, the copper particles are produced in a first liquid medium using a wet reduction method, and thus a dispersion of the copper particles is prepared. Subsequently, the first liquid medium in the dispersion is ultimately, finally or eventually replaced with the second liquid medium while the dispersion is kept wet. It is also preferable that the first liquid medium is replaced with another liquid medium one or more times, and the second liquid medium is used in the final replacement. The liquid media are preferably replaced at a temperature of lower than 100° C. The second liquid medium preferably includes one or more of water, alcohol, ketone, ester, ether, and hydrocarbon.

8 Claims, 1 Drawing Sheet

Example 1

(51) Int. Cl.
*B22F 1/107* (2022.01)
*B22F 9/24* (2006.01)
*H01B 1/02* (2006.01)

(52) U.S. Cl.
CPC ............ *H01B 1/02* (2013.01); *B22F 2301/10* (2013.01); *B22F 2304/056* (2013.01)

(58) Field of Classification Search
USPC .......................................................... 156/326
See application file for complete search history.

(56) References Cited

FOREIGN PATENT DOCUMENTS

| | | | |
|---|---|---|---|
| JP | 2003-151381 | A | 5/2003 |
| JP | 2003-253301 | A | 9/2003 |
| JP | 2007-224422 | A | 9/2007 |
| WO | 2017-057301 | A1 | 4/2017 |

* cited by examiner

Example 1

Comparative Example 1

METHOD FOR PRODUCING BONDING COMPOSITION

CROSS REFERENCE TO RELATED APPLICATIONS

This application is a U.S. National Phase Application under 35 U.S.C. 371 of International Application No. PCT/JP2021/010064, filed on Mar. 12, 2021, which claims priority to Japanese Patent Application No. 2020-058512, filed on Mar. 27, 2020. The entire disclosures of the above applications are expressly incorporated by reference herein.

BACKGROUND

Technical Field

The present invention relates to a method for producing a bonding composition.

Related Art

As electronic devices become smaller and more sophisticated, improvements are required in various types of performance such as dimensional stability, electrical conductivity, and adhesion to components in the formation of electronic circuits in the electronic devices. In order to realize these requirements, for example, there is a demand for conductive paste containing a metal powder with less agglomeration between particles.

JP 2003-151381A discloses a method for producing conductive paste, including a step of adding depositing a metal powder using a wet reduction method, and a step of a water-soluble organic solvent to the metal powder having moisture thereon, thereby replacing the moisture with the water-soluble organic solvent.

JP 2003-253301A discloses a method for producing a metal powder for conductive paste, including washing a metal powder with water or an organic solvent together with crushing of the metal powder.

JP 2003-151381A and JP 2003-253301A above also disclose that the dispersibility of the metal powder can be improved.

Furthermore, US 2009/146117A1 discloses a method for producing silver-containing powder, including vacuum freeze-drying a dispersion of silver-containing particles and a surfactant.

Also, JP 2007-224422A discloses a silver powder, obtained by forming silver particles obtained by a wet reduction method into a wet cake with a predetermined water content, adding a dispersing agent to the wet-cake, and crushing the wet-cake.

US 2009/146117A1 and JP 2007-224422A above also disclose that the dispersibility of the metal powder can be improved as in JP 2003-151381A and JP 2003-253301A.

All of the techniques described in JP 2003-151381A, JP 2003-253301A, US 2009/146117A1, and JP 2007-224422A examine the dispersibility of metal particles, but they do not examine any adhesion to other components when the resulting metal powder or conductive paste containing the metal powder is used for sintering.

It is an object of the present invention to provide a method for producing a bonding composition with excellent adhesion to other components in sintering.

SUMMARY

The present invention is directed to a method for producing a bonding composition, including:

producing copper particles in a first liquid medium using a wet reduction method, thereby preparing a dispersion of the copper particles; and ultimately, finally or eventually replacing the first liquid medium in the dispersion with a second liquid medium while keeping the dispersion wet, thereby obtaining a bonding composition containing the copper particles and the second liquid medium.

DETAILED DESCRIPTION

Figure 1A:
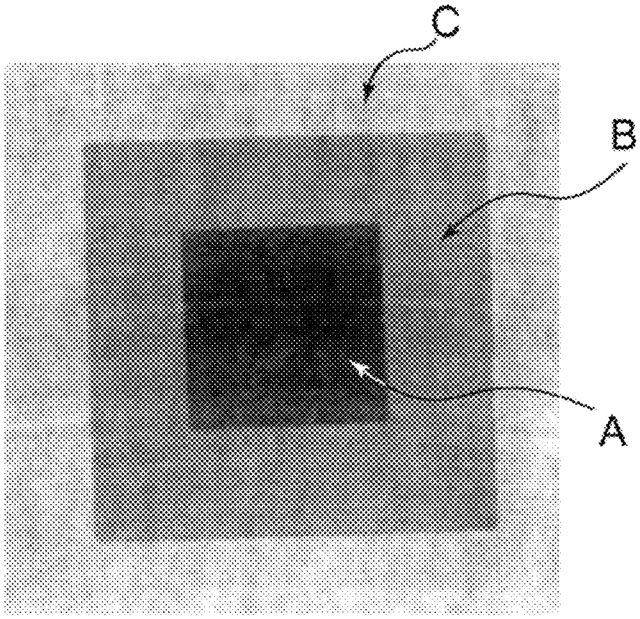
FIGS. 1(*a*) and (*b*) are ultrasonic images of sintered compacts obtained by firing each of the bonding compositions of an example and a comparative example together with objects to be bonded.

Hereinafter, the present invention will be described with reference to a preferred embodiment thereof. The method of the present invention relates to production of a bonding composition containing copper particles and a second liquid medium. The bonding composition is preferably used, for example, as conductive paste or conductive ink for bonding two objects to be bonded. In this case, the bonding composition is preferably a dispersion containing copper particles as a conductive filler and a second liquid medium.

The production method of the present invention is roughly divided into two steps consisting of a step of producing copper particles in a first liquid medium using a wet reduction method, thereby preparing a dispersion of the copper particles, and a step of ultimately, finally or eventually replacing the first liquid medium in the dispersion with a second liquid medium while keeping the dispersion wet.

"Wet" refers to a state in which copper particles are not dried, for example, by heat treatment or the like, that is, the surface of the copper particles is wet and a gas phase and the copper particles are not in direct contact with each other. Specifically, "wet" refers to a state in which the solid concentration of the dispersion of the copper particles in liquid medium is maintained at 95% by mass or less.

Furthermore, "ultimately, finally or eventually replacing the first liquid medium with a second liquid medium" encompasses both of the case in which the first liquid medium is directly replaced with the second liquid medium to obtain a dispersion containing the second liquid medium, which is a final target, and the case in which the first liquid medium is replaced with one or at least two types of another liquid media other than the second liquid medium (another liquid media that are neither the first liquid medium nor the second liquid medium), and the another liquid media (that are neither the first liquid medium nor the second liquid medium) are replaced with the second liquid medium to obtain a dispersion containing the second liquid medium, which is a final target, in the final liquid medium replacing step.

First, copper particles are produced in a liquid medium using the wet reduction method. In the wet reduction method, for example, a copper compound as a copper source and a reducing compound are mixed in a first liquid medium to prepare a reaction solution, and the copper compound in the reaction solution is reduced to obtain target copper particles. Production of copper particles using the wet reduction method makes it easy to control the particle size and to produce spherical particles. Copper particles also can be produced, for example, using the method described in JP 2015-168878A.

In preparing the reaction solution containing the copper compound and the reducing compound, there is no particular limitation on the order or the method for adding the copper compound and the reducing compound. For example, the solid copper compound and the solid reducing compound may be simultaneously added to form the reaction solution. Alternatively, at least one of the copper compound and the reducing compound may be dispersed or dissolved in a liquid medium in advance, and then one compound may be added to the other compound to prepare the reaction solution. When adding one of the copper compound and the reducing compound to the other compound, the compound may be added at once, or may be added continuously or intermittently, for example, dropwise.

As the copper compound, it is preferable to use a compound that dissolves in a liquid medium. Examples of the copper compound include water-soluble copper (II) salts such as copper chloride, copper acetate, and copper sulfate. These copper compounds may be either anhydrous or hydrated. The copper compounds may be used alone or in a combination of two or more.

The copper compound is added in an amount of preferably 0.001 to 1 mol/L, and more preferably 0.1 to 0.5 mol/L in terms of the content of the copper element in the reaction solution. If the content of the copper compound is set to the above-mentioned range, copper particles with a small particle size can be obtained with high productivity.

The reducing compound is used to reduce copper ions in the copper source. Examples of the reducing compound include hydrazine-based compounds such as hydrazine, hydrazine hydrochloride, hydrazine sulfate, and hydrazine hydrate, sodium borohydride, sodium sulfite, sodium hydrogen sulfite, sodium thiosulfate, sodium nitrite, sodium hyponitrite, phosphorous acid, sodium phosphite, hypophosphorous acid, and sodium hypophosphite. These reducing compounds may be either anhydrous or hydrated. The reducing compounds may be used alone or in a combination of two or more.

In particular, it is preferable to use hydrazine because impurities are not generated so much after reduction and impurities do not contaminate the resulting copper particles so much. It is more preferable to use only hydrazine anhydride or hydrazine hydrate as the reducing compound from the viewpoint of obtaining a strong reducing power and suppressing contamination of the particles with impurities.

The reducing compound is added such that the content thereof in the reaction solution is preferably from 0.5 to 50 mol, more preferably from 1 to 10 mol, and even more preferably from 2 to 5 mol, with respect to 1 mol of copper element. If the content of the reducing compound is set to the above-mentioned ratio, copper particles with a small particle size can be obtained with ease. The copper compound may be reduced by the reducing compound once or a plurality of times as necessary. The above-mentioned content of the reducing compound is a value on an anhydride basis.

The reaction conditions of the reaction solution may be such that the reaction is allowed to occur without heating or under heated conditions from the start of mixing to the end of the reaction.

Furthermore, from the viewpoint of obtaining copper particles with little variation in particle size by uniformly causing the reduction reaction, the reaction solution is preferably continuously stirred during the entire time from the start of mixing to the end of the reaction.

From the viewpoint of both progressing the reduction reaction sufficient to form copper particles and reducing production costs, the reaction is preferably allowed to occur while keeping the temperature at 0 to 80° C. from the start of mixing to the end of the reaction. The time from the start of mixing to the end of the reaction may be changed as appropriate according to the target particle size of the copper particles, but it is preferably from 0.5 to 4 hours, and more preferably from 1 to 3 hours. If the copper compound is reduced by the reducing compound a plurality of times, the above-mentioned time is the total of the time from the start of mixing to the end of the reaction of all sessions.

The copper particles are produced through the above-described steps. The copper particles are obtained using the wet reduction method, and thus they are in the form of a dispersion of copper particles dispersed in the first liquid medium serving as a liquid medium of the reaction solution.

The produced copper particles has a particle size expressed as a volume cumulative particle size $D_{SEM50}$ of preferably 100 to 300 nm, and more preferably 100 to 250 nm, $D_{SEM50}$ being at a cumulative volume of 50 vol % as measured by image analysis with a scanning electron microscope. $D_{SEM50}$ indicates the particle size of a primary particle, which is an object recognized as the smallest unit as a particle, judging from the external geometric form, and thus setting the particle size of the copper particles to the above-mentioned range is advantageous in that the bonding composition can exhibit good filling and sintering properties, exhibit high adhesion to other components such as objects to be bonded, and form a thin coating film. The particle size of the copper particles can be adjusted as appropriate, for example, by adjusting the molar ratio between the copper compound and the reducing compound or adjusting the time of the reduction reaction.

$D_{SEM50}$ can be measured, for example, using the following method. First, Mac-View software manufactured by Mountech Co., Ltd. is used to capture image data of copper particles obtained through observation from above with a scanning electron microscope, after which 50 or more copper particles on the data are randomly selected and their particle sizes (Heywood diameters) are measured. Then, the volumes of the particles, assuming that they are spherical, are calculated from the obtained Heywood diameters, and the volume cumulative particle size at a cumulative volume of 50 vol % of the volumes is taken as $D_{SEM50}$.

Subsequently, the first liquid medium in the dispersion is replaced with the second liquid medium while the dispersion of the copper particles is kept wet. One of the features of this step is to, when obtaining a target bonding composition, replace the first liquid medium in the dispersion with the second liquid medium that is a liquid medium ultimately, finally or eventually contained in the bonding composition while keeping the dispersion wet.

In the preparation of the bonding composition such as conductive paste or conductive ink containing copper particles as a conductive filler, typically, a dried copper powder formed by drying the obtained copper particles is used. In this method, it is easy to prepare paste and ink with a desired filler concentration by increasing or decreasing the content of the copper particles as appropriate. However, in the case of preparing the bonding composition using a dried copper powder, copper particles in the dried copper powder may agglomerate or may be likely to agglomerate, which makes it difficult or impossible to re-disperse the particles. As a result, the coating film obtained by applying the bonding composition is unlikely to be smooth, and is poor in adhesion to other components. Furthermore, the surface of the copper particles may be altered by oxidation or the like during drying, which makes it impossible to obtain desired properties such as adhesion and conductivity.

In particular, if copper particles with a particle size suitable for ink or paste are used in a dry state, the particles are more difficult to re-disperse and are more likely to be altered by oxidation or the like.

In order to solve this issue, the inventors of the present invention conducted research and found the following facts. If the obtained copper particles are subjected to the subsequent steps while keeping the particles wet without drying them, contact between the copper particles and oxygen in air is suppressed. Moreover, since the dispersibility of the copper particles when preparing the bonding composition increases, generation of excessive stress during film forming and sintering is suppressed. As a result, the bonding composition of the present invention exhibits excellent adhesion to other components in sintering and is less likely to be detached from other components due to excessive volume shrinkage in sintering.

The first liquid medium may be directly replaced with the second liquid medium (also referred to as "direct replacement" hereinafter), or the first liquid medium may be replaced with another liquid medium (that is not the second liquid medium) one or more times, and then the resulting medium may be ultimately, finally or eventually replaced with the second liquid medium (also referred to as "indirect replacement" hereinafter). The dispersions that are kept wet in these processes may be each independently in the form of a slurry or a wet cake, for example.

As long as the dispersion can be kept wet, there is no particular limitation on the method for replacing the liquid media regardless of whether the replacement is performed directly or indirectly, and, for example, repulping, decantation, rotary filtering, filtration, and the like can be employed. Furthermore, the liquid media may be replaced only once or a plurality of times as necessary.

Regardless of whether the replacement is performed directly or indirectly, the liquid media are replaced at a liquid medium temperature of preferably lower than 100° C., more preferably 80° C. or lower, and even more preferably 60° C. or lower. If the temperature is set to the above-mentioned range, it is possible to suppress evaporation of the liquid media during the replacement, thereby obtaining a bonding composition with excellent adhesion to other components while maintaining the wet state and high dispersibility of the copper particles.

In the step of ultimately, finally or eventually replacing the first liquid medium with a second liquid medium, from the viewpoint of efficiently removing substances that have been derived from the first liquid medium and that may generate impurities and the viewpoint of improving the operation efficiency in replacement with the second liquid medium that is to be contained in the target bonding composition, it is preferable that the first liquid medium contained in the dispersion of copper particles obtained using the wet reduction method is replaced with another liquid medium (that is neither the first liquid medium nor the second liquid medium) one or more times, and the second liquid medium is used in the final replacement. That is to say, indirect replacement is preferably used for this production method.

Furthermore, also in the case in which the first liquid medium is replaced with another liquid medium (that is not the second liquid medium) a plurality of times, the replacement is preferably performed while the dispersion is kept wet in all of the step of replacing the first liquid medium with a first another liquid medium, the step of replacing the another liquid medium with another liquid medium when using two more types of another liquid media, and the step of replacing a last another liquid medium with the second liquid medium.

In the case in which the first liquid medium is replaced with another liquid medium one or more times, the solid concentrations in these replacement steps may be each independently the same or different from each other.

Since the liquid media are replaced while the copper particles are kept wet, it is possible to obtain copper particles that have high re-dispersibility and are unlikely to be altered, while efficiently removing substances that have been derived from the first liquid medium and that may generate impurities, and thus, when a bonding composition containing the copper particles is sintered, adhesion to other components can be further improved.

The method for replacing the first liquid medium with another liquid medium one or more times according to an embodiment is, for example, a method in which the dispersion of the copper particles in the first liquid medium obtained using the wet reduction method is washed with another liquid medium such as water.

In the case of performing washing, examples of the method include repulping, decantation, rotary filtering, filtration, and the like. When washing is performed, the washed copper particles are preferably subjected to the subsequent steps in the form of a dispersion that is kept wet.

In the case of washing the copper particles through decantation, for example, another liquid medium is added, and washing is performed until the electrical conductivity of the dispersion reaches preferably 5 mS or less. The washing conditions in this time are such that, for example, when using water as the another liquid medium, the washing temperature is preferably lower than 100° C., and more preferably from 15 to 30° C. If washing is performed under these conditions, it is possible to subject copper particles that are kept uniformly dispersed to the subsequent steps while decreasing impurities contained in the particles. Subsequently, the dispersion of the washed copper particles in the liquid medium is subjected to final replacement to the second liquid medium while the dispersion is kept wet.

The method for replacing the first liquid medium with another liquid medium one or more times according to another embodiment is, for example, a method described in "Examples", which will be described later, but, as long as the effects of the present invention are achieved, the method can be performed without particularly limiting the number of times of replacement and the type of liquid medium to be used. Subsequently, the dispersion of the copper particles in the liquid medium is subjected to final replacement to the second liquid medium while the dispersion is kept wet.

It is possible to obtain a bonding composition containing the copper particles and the second liquid medium through the above-described steps. This production method makes it easy to disperse copper particles when preparing the bonding composition and suppresses agglomeration between copper particles, and thus a smooth coating film can be efficiently formed. Furthermore, the surface alteration of the copper particles can be suppressed. As a result, when a coating film made of the bonding composition is sintered, the melting property of the copper particles can be increased and the contact area between the molten particles and other components can be increased. As a result, it is possible to obtain a sintered compact that is unlikely to be cracked or detached and that is excellent in terms of adhesion to other components.

From the viewpoint of efficiently progressing the reduction of copper using the wet reduction method, the first liquid medium that is used for this production method preferably includes one or more of water, alcohol, ketone, ester, and ether, and, from the viewpoint of improving the efficiency in producing copper particles by increasing the miscibility with copper salts in production of copper particles using the wet reduction method, the first liquid medium more preferably includes one or more of water and alcohol.

Furthermore, from the viewpoint of improving the productivity by making it possible to use the bonding composition as is as conductive paste or conductive ink, the second liquid medium that is used for this production method preferably includes one or more of water, alcohol, ketone, ester, ether, and hydrocarbon, and more preferably alcohol and hydrocarbon.

Note that the first liquid medium and the second liquid medium described above may be the same or different from each other.

From the viewpoint of both decreasing the amount of first liquid medium remaining and facilitating replacement with the second liquid medium, in the case of using another liquid medium (that is neither the first liquid medium nor the second liquid medium), the another liquid medium preferably includes one or more of water, alcohol, ketone, ester, ether, and hydrocarbon, and more preferably includes one or more of water and alcohol.

Examples of the alcohol include: monohydric alcohols such as methanol, ethanol, n-propanol, 2-propanol, and n-butanol; and polyhydric alcohols such as diols such as ethylene glycol, 1,2-propylene glycol, 1,3-propylene glycol, butylene glycol, pentylene glycol, and hexylene glycol, triols such as glycerin, and polyols such as polyethylene glycol and polypropylene glycol.

Examples of the ester include fatty acid esters of the above-mentioned polyhydric alcohols. The fatty acid is, for example, a monovalent fatty acid preferably with 1 to 8 carbon atoms, and more preferably with 1 to 5 carbon atoms. The esters of the polyhydric alcohols preferably have at least one hydroxyl group.

Examples of the ketone include those in which the number of carbon atoms of an alkyl group attached to a carbonyl group is preferably from 1 to 6, and more preferably from 1 to 4. Specific examples of the ketone include methyl ethyl ketone and acetone.

Examples of the ether include chain ethers such as dimethyl ether, ethyl methyl ether, and diethyl ether, and cyclic ethers such as octacene, tetrahydrofuran, and tetrahydropyran.

Examples of the hydrocarbon include aliphatic hydrocarbons such as hexane, heptane, octane, nonane, decane, undecane, dodecane, tridecane, tetradecane, pentadecane, and hexadecane.

In the case of direct replacement, the first liquid medium and the second liquid medium that are used are preferably miscible with each other at 1 atm and 25° C. "Miscible" refers to a phenomenon in which, in a fluid containing two or more liquid components, the two or more liquid components mix with each other to form a single phase.

If liquid media that are miscible with each other are used, the first liquid medium can be replaced with the second liquid medium while the particle dispersibility in the dispersion of the copper particles in the first liquid medium is maintained. Moreover, since the first liquid medium can be replaced with the second liquid medium while alteration of the copper particles is suppressed, when the resulting bonding composition is sintered, the melting property of the copper particles can be increased and the contact area between the molten particles and other components can be increased. As a result, a sintered compact with high adhesion to other components and few impurities can be obtained.

Meanwhile, in the case of indirect replacement, if replacement between the first liquid medium and another liquid medium is performed one or more times, it is preferable that the first liquid medium and a first another liquid medium are miscible with each other. Furthermore, if replacement to another liquid medium is performed two or more times, it is preferable that another liquid media that are used in successive steps are miscible with each other and a last another liquid medium and the second liquid medium are miscible with each other, and it is more preferable that the liquid media in each of these combinations are miscible with each other at 1 atm and 25° C.

Furthermore, in the case of indirect replacement, the first liquid medium and the second liquid medium may be or may not be miscible with each other at 1 atm and 25° C.

If liquid media that are miscible with each other are used every time the liquid media are replaced, substances that have been derived from the first liquid medium and another liquid media and that may generate impurities can be efficiently removed. As a result, a sintered compact with high adhesion to other components and few impurities can be obtained.

Furthermore, according to an aspect of indirect replacement, the first liquid medium may be replaced with another liquid medium (that is neither the first liquid medium nor the second liquid medium) with a lower viscosity than the first liquid medium in order to decrease impurities in the dispersion, and then the medium may be ultimately, finally or eventually replaced with the second liquid medium with a higher viscosity than the another liquid medium (that is neither the first liquid medium nor the second liquid medium). The viscosity of a liquid medium can be measured, for example, by an oscillating viscometer or a rotational viscometer.

It is preferable that the step of producing copper particles using the wet reduction method and the step of replacing the first liquid medium with the second liquid medium, and, as necessary, the step of replacing the first liquid medium with another liquid medium and the step of replacing the another liquid medium with the second liquid medium are performed in the absence of an organic polymer, and more it is preferable that all steps in the production method of the present invention are performed in the absence of an organic polymer.

In order to make organic polymers absent in the reaction system in this producing method, for example, it is sufficient that organic polymers and raw materials containing organic polymers are not used in the steps of the wet reduction method and the replacement of liquid media.

If the steps are performed in the absence of an organic polymer, a low degree of agglomeration of the copper particles can be maintained, and, when the bonding composition is sintered, the sintering of the copper particles can be sufficiently progressed. Moreover, the content of residual organic matter, which is one of impurities and can be an inhibitor for sintering, can be decreased, resulting in a high density and excellent adhesion to other components.

Examples of the organic polymers described above include natural and synthetic polymers used as dispersants and surface treatment agents in the technical field. Specific examples of the natural polymers include proteins such as gelatin, gum arabic, casein, sodium caseinate, ammonium caseinate, starch, dextrin, agar, and sodium alginate. Examples of the synthetic polymers include cellulose-based compounds such as hydroxyethylcellulose, carboxymethylcellulose, methylcellulose, and ethylcellulose, polyvinyl-based compounds such as polyvinyl alcohol, and polyacrylic acid-based compounds such as sodium polyacrylate and ammonium polyacrylate.

The bonding composition obtained through the above-described steps is a dispersion containing the copper particles and the second liquid medium. The bonding composition may contain only the second liquid medium as a liquid medium constituting the composition, or may inevitably contain, in addition to the second liquid medium, liquid media used in previous liquid medium replacement. In either case, it is preferable that the second liquid medium is the most abundant as a mass fraction of all the liquid media constituting the bonding composition.

The bonding composition can be used as conductive paste or conductive, as is or, as necessary, as a mixture obtained by adding at least one of metal particles other than copper particles contained in the bonding composition, a liquid medium, a binder resin, and the like. That is to say, the present invention also encompasses a method for producing conductive paste containing at least the bonding composition obtained through the above-described steps, including a step of further mixing the composition and, as necessary, at least one of metal particles other than copper particles contained in the bonding composition, a liquid medium, and a binder resin.

Examples of the metal particles that can be further added to the bonding composition include particles of metals such as copper, silver, and gold.

Examples of the liquid medium that can be further added to the bonding composition include liquid media that are similar to those given as an example in the description of the first liquid medium and the second liquid medium above and that are miscible with a binder resin.

Examples of the binder resin that can be further added to the bonding composition include one or more of acrylic resin, epoxy resin, polyester resin, polycarbonate resin, cellulose resin, and the like.

The bonding composition may be placed between any two materials to be bonded, through application or the like using a predetermined means, so that the two materials can be bonded to form a bonded structure. That is to say, the present invention also encompasses a method for bonding materials to be bonded and a method for forming a bonded structure, including placing the bonding composition between two materials to be bonded. The materials to be bonded may be each independently a substrate, a semiconductor element, or the like. According to a specific embodiment, for example, the composition can be used as bonding agents for surface mounting electronic devices on printed wiring boards or as materials for filling vias in printed wiring boards. Furthermore, it can be used to form wiring circuits on printed wiring boards and to form electrodes for chip components.

The invention has been described above based on its preferred embodiments, but the invention is not limited to the aforementioned embodiments. For example, as long as the effects of the present invention are achieved, the copper particles obtained using the wet reduction method do not exclude the resulting copper particles inevitably containing trace amounts of other elements or the copper particles whose surfaces are inevitably slightly oxidized.

EXAMPLES

Hereinafter, the present invention will be described in more detail by means of the following example. However, the scope of the invention is not limited to the example.

Example 1

In this example, a bonding composition was produced in the absence of an organic polymer in all steps.

(1) Production of Copper Particles using Wet Reduction Method

A liquid medium mixture of 5.0 liters of warm pure water and 5.0 liters of methanol as the first liquid medium and 2.5 kg of copper acetate as a copper source were placed into a 36-liter stainless steel tank, and copper acetate was dissolved by stirring the mixture at a liquid temperature of 40° C. for 30 minutes. Then, after 150 g of hydrazine was added at once to the liquid medium, the stirring was continued at a liquid temperature of 40° C. for 30 minutes to produce copper suboxide particles in the liquid medium. After 30 minutes, 1400 g of hydrazine was further added at once to the liquid medium, and then the stirring was continued at a liquid temperature of 40° C. for 60 minutes to reduce the fine copper suboxide particles to fine metal copper particles. In this manner, a dispersion in which the copper particles were dispersed in the first liquid medium was obtained. The dispersion was kept wet. The particle size $D_{SEM50}$ of the obtained copper particles was 155 nm.

(2) Replacement of Liquid Media

In this example, the first liquid medium was replaced with another liquid medium a plurality of times, and then the resulting medium was replaced with the second liquid medium as the final replacement. All steps were performed while the dispersion was kept wet.

Specifically, pure water that is miscible with the first liquid medium was used as the first another liquid medium. The dispersion of the copper particles in the first liquid medium was washed with pure water by decantation until the conductivity reached 3.5 mS, and thus a first dispersion in which the copper particles were dispersed in water was obtained. This first dispersion was kept wet.

Then, a modified alcohol (a liquid medium mixture of 89% by mass of ethanol and 11% by mass of 2-propanol) that is miscible with the first another liquid medium was used as the second another liquid medium. The first dispersion was washed with the modified alcohol using a rotary filter until the moisture concentration in the first dispersion reached 1% by mass or less, and thus a second dispersion in which the copper particles were dispersed in the modified alcohol was obtained. This second dispersion was kept wet.

Subsequently, hexylene glycol that is miscible with the second another liquid medium was used as the second liquid medium for use in the final replacement. The second dispersion was washed with hexylene glycol using a rotary filter until the modified alcohol concentration in the second dispersion reached 3% by mass or less, after which the hexylene glycol was subjected to solid-liquid separation by pressurized filtration, and thus a bonding composition in which the copper particles were dispersed in the second liquid medium was obtained. This bonding composition was kept wet with a solid concentration of 92%.

(3) Preparation of Bonding Paste 7.6 parts by mass of bonding composition, 3 parts by mass of metal particles (copper particles 1200YF manufactured by Mitsui Mining & Smelting Co., Ltd.) other than copper particles contained in the bonding composition, 0.5 parts by mass of BIS-TRIS/hexylene glycol solution with a solid concentration of 50% by mass, and 0.1 parts by mass of polyethylene glycol 300 were mixed, and hexylene glycol was used as the remainder, and thus bonding paste containing the copper particles with a copper particle concentration of 76% by mass was prepared.

Comparative Example 1

After "(1) production of copper particles using wet reduction method" was performed in a similar way to that of Example 1, the dispersion of the copper particles in the first liquid medium was washed with pure water by decantation until the conductivity reached 3 mS, and thus a dispersion in which the copper particles were dispersed in water was obtained. This dispersion was kept wet.

Then, the dispersion was heated to 50° C., a dimethylglyoxime/methanol solution was added thereto while stirring the dispersion until the content of dimethylglyoxime to the copper particle content reached 0.5% by mass, the mixture was stirred at a liquid temperature of 50° C. for 1 hour, and thus a dispersion of the surface-treated copper particles in water/methanol was obtained.

Subsequently, the surface-treated copper particles were vacuum dried to obtain copper particles in a dry state. No liquid medium was present on these copper particles.

Lastly, bonding paste with similar composition and concentration to those in Example 1 was prepared using the dry copper particles, instead of the bonding composition.

Evaluation of Adhesion

The bonding paste in each of the example and comparative example was applied in a size of length 10 mm×width 10 mm×thickness 110 μm through screen printing to the center of the surface of a copper plate (length 20 mm×width 20 mm×thickness 2 mm), and then was dried at 110° C. for 20 minutes to obtain a dry film.

Next, an alumina plate with Ag-plated surface (length 5 mm×width 5 mm×thickness 0.5 mm) was placed on the dry film and sintered in a nitrogen atmosphere at 6 MPa, at a temperature increase rate of 120° C./min, and at 280° C. for 20 minutes, and thus the copper plate and the alumina were bonded to each other.

Figure 1B:
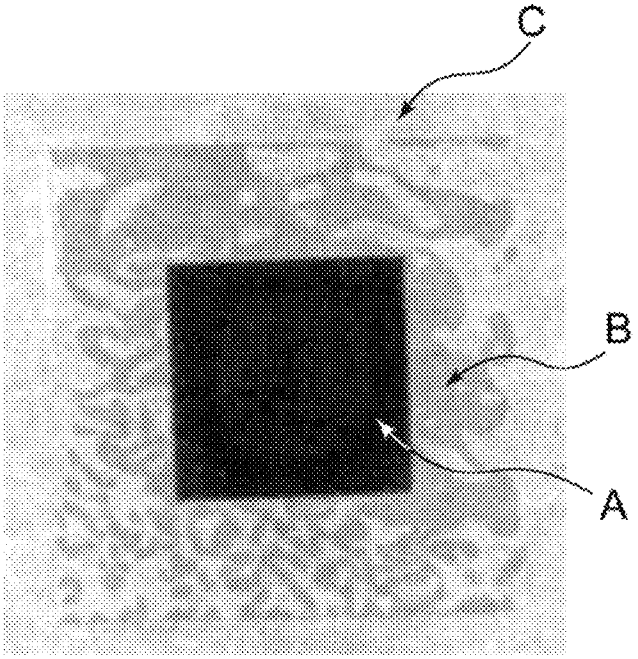

After bonding, the copper plate was observed by a reflection method from the side where the alumina plate had been placed, using an ultrasonic flaw detector (model No.: FineSATIII, manufactured by Hitachi Power Solutions Co., Ltd.) with a 75 MHz probe to determine the presence or absence of voids in the sintered dry film and the condition of the outer periphery (the area not under pressure) of the alumina plate in the sintered dry film. The denser the sintered structure, the darker the color observed. FIG. 1 shows the results.

In FIG. 1, the area where the alumina plate is located is denoted by A, the area where the sintered dry film is present is denoted by B, and the area where the copper plate is exposed is denoted by C.

As shown in FIG. 1(*a*), the sintered compact of the paste obtained using the bonding composition of Example 1 is observed to be darker in color in the area A where the alumina plate is located, indicating that a dense structure with few voids is formed, and the bonding condition between the alumina plate and the copper plate is good. Furthermore, in the area B where the sintered compact is present on the periphery of the alumina plate, the observed color is uniform and no detachment between the sintered compact and the copper plate was observed. Therefore, it is found that the paste using the bonding composition of Example 1 is excellent in terms of adhesion to other components.

On the other hand, as shown in FIG. 1(*b*), although the sintered compact of the paste obtained using the bonding composition of Comparative Example 1 is observed to be darker in color in the area A where the alumina plate is located, indicating that the bonding condition between the alumina plate and the copper plate is good, in the area B where the sintered compact is present on the periphery of the alumina plate, the observed color is not uniform and detachment between the sintered compact and the copper plate was observed at many points. Therefore, it is found that the paste using the bonding composition of Comparative Example 1 is poor in terms of adhesion to other components.

INDUSTRIAL APPLICABILITY

According to the production method of the present invention, it is possible to provide a bonding composition with excellent adhesion to other components in sintering.

The invention claimed is:

1. A method for producing a bonding composition, comprising:

producing copper particles in a first liquid medium using a wet reduction method, thereby preparing a dispersion of the copper particles; and ultimately, finally or eventually replacing the first liquid medium in the dispersion with a second liquid medium while keeping the dispersion wet, thereby obtaining a bonding composition containing the copper particles and the second liquid medium, wherein the method is performed in the absence of an organic polymer.

2. The method for producing a bonding composition according to claim 1, wherein the first liquid medium is replaced at a temperature of lower than 100° C.

3. The method for producing a bonding composition according to claim 1, wherein the second liquid medium comprises one or more of water, alcohol, ketone, ester, ether, and hydrocarbon.

4. The method for producing a bonding composition according to claim 1, wherein the copper particles have a volume cumulative particle size $D_{SEM50}$ of 100 to 300 nm, $D_{SEM50}$ being at a cumulative volume of 50 vol % as measured with a scanning electron microscope.

5. The method for producing a bonding composition according to claim 1, wherein the first liquid medium is replaced with another liquid medium one or more times, and the second liquid medium is used in a final replacement.

6. The method for producing a bonding composition according to claim 5, wherein the first liquid medium is replaced with another liquid medium while the dispersion is kept wet.

7. A method for producing conductive paste comprising the bonding composition obtained using the method for producing a bonding composition according to claim 1.

8. A method for bonding materials to be bonded, wherein the bonding composition obtained using the method for producing a bonding composition according to claim 1 is placed between two materials to be bonded.

* * * * *